United States Patent [19]

Schwartz et al.

[11] 4,064,298
[45] Dec. 20, 1977

[54] FLAME-RETARDANT POLYAMIDE FIBER FOR USE IN CARPETS

[75] Inventors: Judd Leonard Schwartz, Chester; Richard Eugene Mayer, Richmond, both of Va.

[73] Assignee: Allied Chemical Corporation, Morris Township, N.J.

[21] Appl. No.: 725,908

[22] Filed: Sept. 22, 1976

[51] Int. Cl.² ..................... D03D 27/00; D04H 11/00
[52] U.S. Cl. .............................. 428/95; 260/45.7 RT; 260/45.95 G; 260/45.75 W; 260/45.8 A; 428/96; 428/97; 428/921
[58] Field of Search ................ 260/45.75 W, 45.95 G, 260/45.7 R, 45.8 A, 45.7 RL; 428/921, 95, 96, 97

[56] References Cited

U.S. PATENT DOCUMENTS

| | | | |
|---|---|---|---|
| 3,524,761 | 8/1970 | Humphrey | 260/45.75 W |
| 3,663,345 | 5/1972 | Jaisinghani | 428/97 |
| 3,719,547 | 3/1973 | Martin et al. | 428/96 |
| 3,733,283 | 5/1973 | Duggins | 260/45.7 R |
| 3,810,861 | 5/1974 | Tacke et al. | 260/37 N |
| 3,861,992 | 1/1975 | DeNobriga et al. | 428/96 |
| 3,874,889 | 4/1975 | Geppert et al. | 260/2.5 FP |
| 3,897,346 | 7/1975 | Vogel | 260/42.24 |
| 3,985,926 | 10/1976 | Schwartz et al. | 428/95 |
| 4,012,546 | 3/1977 | Schwartz et al. | 428/95 |

*Primary Examiner*—V. P. Hoke
*Attorney, Agent, or Firm*—Fred L. Kelly

[57] ABSTRACT

A flame-retardant polyamide fiber is prepared and made into a flame-retardant carpet. The polyamide fiber has incorporated therein from 1 to 15 percent by weight of zinc borate and from 1 to 15 percent of an organic halide which is substantially non-reactive with the polyamide except at temperatures above 300° C. The flame-retardant fiber shows improved luster and improved colorfastness to light when dyed.

6 Claims, No Drawings

FLAME-RETARDANT POLYAMIDE FIBER FOR USE IN CARPETS

CROSS-REFERENCES TO RELATED APPLICATIONS

This application is related to our copending application Ser. No. 712,287, filed Aug. 6, 1976.

BACKGROUND OF THE INVENTION

This invention relates to flame-retardant polyamides, i.e., polymers having the polycarbonamide group in the main polymer chain. In particular, this invention relates to flame-retardant polyamide fibers for use in flame-retardant carpets. In one of its more specific embodiments, this invention relates to flame-retardant polyamide carpets and process for the preparation thereof.

A number of metal compounds have been reported in the literature as flame retardants for various substrates. By far the most notable prior art compounds are antimony oxide and antimony chloride. Other metal compounds described as fire retardants include phosphates and borates of alkali metals and alkaline earth metals, aluminum hydrate, titanium salts, tin salts, and double salts such as potassium hexafluorozirconate and potassium hexafluorotitanate.

In recent years, much research has been carried out directed to production of flame-retardant carpeting. The following patents indicate the state of this art.

U.S. Pat. No. 3,418,267 to W. F. Busse relates to flame-resistant polyamides and process thereof. The patent dicloses that polyamide resin is made flame retardant by incorporating therein from 5 to 20 percent by weight of an organic halide, e.g., chlorinated biphenyl, which is reactive with the resin only at its pyrolysis temperature and from 3 to 15 percent by weight of an oxide of tin, lead, copper, iron, zinc or antimony.

U.S. Pat. No. 3,663,345 to G. G. Jaisinghani, discloses a fire retardent carpet in which the pile fibers are fixed to the primary backing by a compound comprising a latex binding material combined with an aluminum hydrate.

U.S. Pat. No. 3,719,547, to D. H. Martin et al., described a flame-retardant pile fabric. A fibrous layer composed of combustible filaments or fibers extends from the top surface of a fibrous backing to present a pile surface. A coating of a film-forming halogen-containing polymer and a water-insoluble organo-phophorus compound is applied to and confined essentially to the top surface of the backing. Where the backing is made of a thermoplastic material, a coating of the halogen-containing polymer may be used without the organic-phosphorus compound.

It has been suggested in U.S. Pat. No. 3,956,236, to F. E. Evans et al., that flame resistance of carpets, such as polyamide and polyester carpets, can be increased by adding a synergistic composition comprising a metal salt of certain organic acids, particularly metal salts of hydroxycarboxylic acids, with certain organic acids or their ammonium salts, particularly hydroxycarboxylic acids or their ammonium salts. Also, U.S. Pat. No. 3,943,100, to M. B. Berenbaum et al., describes flame retardants based on certain organic acids, e.g., gallic acid, citric acid, or tartaric acid, or the ammonium, lithium or magnesium salts thereof. Although these patents constitute a major contribution to this art, investigations have been continued to develop an improved flame-retardant carpet wherein the flame retardant polyamide fiber has improved luster and/or improved colorfastness to light when the fiber is dyed.

SUMMARY OF THE INVENTION

It has now been discovered that the flame-retardant ability of polyamide fibers for use in flame-retardant carpets is enhanced by the incorporation therein of 1 to 15 percent of the total weight of an organic halide which is substantially non-reactive with the polyamide except at temperatures above 300° C. and from 1 to 15 percent of the total weight of zinc borate. Surprisingly, the flame-retardant polyamide fiber of the present invention provides superior flame retardancy and also provides improved fiber luster and improved colorfastness to light when the fiber is dyed with conventional dyes.

Examples of polyamides which are useful in the present invention include polycaprolactam, the polyamides which are derived from the condensation of a dicarboxylic acid with a diamine, such as polyhexamethylene adipamide and polyhexamethylene sebacamide, and copolymers thereof.

Examples of the non-reactive organic halides include the stable cycloaliphatic halides and the stable aryl halides with the chlorides of each being preferred. The organic halides are preferably substituted with halogen only but other substituents can be present so long as they do not interfere with the fire-retardant effect of the halide when coupled with the zinc borate. The cycloaliphatic halides include Dechlorane ($C_{10}Cl_{12}$), Dechlorane Plus ($C_{18}H_{12}Cl_{12}$), and chlorendic anhydride. The aryl halides include mono-nuclear compounds such as pentabromophenol and poly-nuclear compounds such as chlorinated biphenyl containing greater than about 50% by weight of chlorine and naphthalene containing at least 50% by weight of chlorine, such as the Halowaxes 1001, 1006, 1013, 1014, and 1051. The polynuclear aromatic halides containing from 50 to 80% chlorine are preferred for the higher melting polyamides such as 66 nylon which is processed at 240°–280° C. while the remaining organic halides are preferably used with the lower melting polyamides such as 610 nylon.

The polyamide and flame-retardent agents can be compounded to form an intimate mixture by any of the well-known methods and machines available. Minimum processing time at elevated temperature and the use of dry ingredients are preferred in order to minimize the chance of reaction between the organic halide and the polyamide. The ingredients can be blended in the dry form and then extruded or the fire-retardant agents can be incorporated into the molten polymer as it is synthesized if the temperatures are such that the organic halide does not react with the polymers. In order to avoid oxidation of the polymer during any heating step, it is preferred that such heating be carried out in an inert atmosphere.

The term "flame-retardant carpet" is used herein to mean that the carpet burns very slowly in a confined area when exposed to air in a direct flame or its equivalent. The preferred method of testing for flame-retardant properties may be referred to as the "Critical Radiant Flux Test" described in a report entitled NBSIR 75-950 Proposed Criteria for Use of the Critical Radiant Flux Test Method, which report is available from the National Bureau of Standards, U.S. Department of Commerce.

The test apparatus comprises a gas fired refractory radiant panel inclined at a 30° angle over the exposed portion of a horizontally mounted test specimen. The specimen surface is 3–9 inches below the lower edge of the radiant panel. The radiant panel and an adjustable height specimen transport system are enclosed in an asbestos mill board sheathed chamber with provision for a free flow of draft-free air to simulate natural burning conditions. There is a glass viewing window in the front face of the chamber. Below the window is a door which can be opened to facilitate placement and removal of the test specimen. In the examples herein, the test conditions selected involve a 30° panel angle, a panel temperature of 525° C., and the distance from panel to sample is 5.5 inches. In order to carry out our tests under extremely rigorous conditions, the carpet is burned over a 50 oz./yd.$^2$ hair jute pad. Distance burned (cm.) is recorded and critical energy is determined in terms of flux (watts/cm.$^2$).

The flame-retardant carpet may be tested for color-fastness to light by methods developed by the American Association of Textile Chemists and Colorists (AATCC). We prefer to use AATCC Test Method 16E-1974, entitled Colorfastness to Light: Water-Cooled Xenon-Arc Lamp, Continuous Light, wherein specimens and standards are examined after exposure for periods necessary to establish the point at which a color change equivalent to Step 4 of the Gray Scale is observed on the test specimen.

The luster of the flame-retardant polyamide fiber of the present invention involves the fact or quality of shining with reflected light. Luster properties of the fiber may be determined by visual comparison of the present fiber with prior art flame-retardant polyamide fibers and/or with polyamide fibers containing no flame-retardant additives. The property of luster is important because it relates to splendor or radiance of beauty of the fiber. Heretofore, the luster of most flame-retardant polyamide fibers has been poor.

DESCRIPTION OF THE PREFERRED EMBODIMENT

The preferred process of this invention is an improvement over known processes for preparing carpeting. When carpeting is conventionally manufactured, the fibers are tufted on a relatively pliable primary backing which may be manufactured from any suitable materials such as jute or a man-made fiber such as polypropylene. The non-wear side of the backing is then coated with a bonding material of any suitable type such as latex. The latex serves to hold the fibers in place so that they cannot be pulled free from the primary backing, and also to bond the primary backing to the secondary backing. In the past, clay has been added to the latex as a filler to reduce the cost of the bonding compound. The secondary backing, which may also be jute or artificial fiber, strengthens the carpet and ensures that the bonding material does not come into contact with the floor upon which the carpet is laid.

In one preferred embodiment, the present invention provides a flame-retardant pile carpet having a relatively pliable primary backing and a tufted surface, said surface being comprised of fibers selected from the group consisting of polyamide fibers having incorporated therein from 1 to 15 percent of the total weight of an organic halide which is substantially non-reactive with the polyamide except at temperatures above 300° C. and from 1 to 15 percent of the total weight of zinc borate. More preferably, the organic halide is an organic chloride containing from 50 to 80 weight percent by weight of chlorine.

It will be understood that the above-described flame-retardant carpet is normally given a secondary backing, e.g., it may be given a secondary backing of jute using a latex binder. A conventional latex may be used, e.g., a styrene-butadiene latex, which is commercially available. Preferably, the bonding substance comprises a latex material and a hydrate material selected from the group consisting of aluminum hydroxide, hydrated aluminum oxide and hydrated aluminum silicates, such as kaolinite, dickite, nacrite and endellite, the ratio by weight of said latex material to said hydrate material being from 1:2 to 1:4.5.

The primary carpet backing is made from any suitable material. It may be a conventional woven jute construction. Also, the backing may be made of a nonwoven fibrous mass made of cellulosic or non-cellulosic material, including nylon, polyester, and polyolefin. Other fabric backing structures likewise can be used.

The following examples are illustrative of the present invention. Parts and percentages are by weight unless otherwise indicated.

EXAMPLE 1

A reactor equipped with a heater and stirrer was charged with a mixture of 1,520 parts of e-caprolactam and 80 parts of aminocaproic acid. The mixture was then flushed with nitrogen and was stirred and heated to 255° C. over a one-hour period at atmospheric pressure to produce a polymerization reaction. The heating and stirring was continued at atmospheric pressure under a nitrogen sweep for an additional four hours in order to complete the polymerization. Nitrogen was then added to the reactor and a small pressure was maintained while the polymer was extruded from the reactor in the form of a polymer ribbon. The polymer ribbon was subsequently cooled, pelletized, washed and then dried. The polymer was a white solid having a relative viscosity of about 50 to 60 as determined at a concentration of 11 grams of polymer in 100 ml. of 90 percent formic acid at 25° C. (ASTM D-789-62T).

The polymer pellets were blended with about 2 percent of the total weight of finely ground zinc borate hydrate (2 ZnO . 3B$_2$O$_3$ . 3.5 H$_2$O) and about 2 percent of the total weight of Dechlorane Plus (C$_{18}$H$_{12}$Cl$_{12}$) in a conventional blender and melt extruded under pressure of 1,500 psig to a 70-orifice spinnerette to produce a fiber having about 3,600 denier. The fiber was collected, drawn at about 3.2 times the extruded length, and textured with a steam jet to produce yarn suitable for use in carpet. This yarn will hereinafter be called Yarn A. A control yarn containing no zinc borate or Dechlorane was prepared in the same manner as described above. This yarn will hereinafter be called Yarn B.

The yarns were then two-plied by twisting two ends together with a 1.5 S twist. The yarns were tufted into a level loop 20 oz./yd.$^2$ carpet at about 8.0 stitch rate. A relatively pliable nonwoven polypropylene fabric was used as the primary backing. Tufting was carried out on a conventional tufting machine operated to give a pile having a height of 5/32 to 7/32 inch.

About 8 parts of a 50 percent emulsion of a conventional styrene-butadiene latex was mixed with 8 parts of hydrated aluminum oxide to form a binding composition. On a dry basis, the latex-hydrate weight ratio of the binding composition was 1:2. The mixture was then applied onto the fabric described in the preceding paragraph by conventional means at the rate of 32 oz./yd.² of carpet on a dry basis. With the dilution described, the penetration of the mixture past the backing and into the tufts of the fabric was less than one-sixteenth inch so that the aesthetic properties of the pile carpet was not impaired. The carpeting was backed with a secondary jute backing and then passed through an oven at about 125° C. to cure the latex on the carpet. The following table compares the carpets made from Yarn A and Yarn B with respect to the distance burned and the critical energy necessary to propagate the flame as measured by the above-described Critical Radiant Flux Test.

| Carpet System | Distance Burned (cm.) | Critical Energy Watts/cm.² |
|---|---|---|
| Made with Yarn A | 57 | 0.27 |
| Made with Yarn B | Greater than 91 | Less than 0.13 |

Clearly, the carpet made with Yarn A was significantly more flame-retardant than the carpet made with Yarn B. It was noted that the luster of Yarn A was excellent and that the luster of Yarn A was equal to that of Yarn B which contained no flame retardant additives.

In additional comparative tests, it was shown that the use of aluminum hydroxide or hydrated aluminum oxide is also a critical component of the carpet of the present invention. For example, a conventional carpet containing calcium carbonate as filler instead of hydrated aluminum oxide was completely burned in the above-described Critical Radiant Flux Test.

EXAMPLE 2 (Comparative)

A flame-retardant carpet was prepared by the procedure of Example 1 except that 2 percent of zinc oxide was blended with the polymer instead of the 2 percent of zinc borate. Also, 2 percent of Dechlorane Plus was blended with the polymer as in Example 1. The resulting carpet was tested in accordance with the above-described Critical Radiant Flux Test with the following results:

| Distance Burned (cm.) | Critical Energy, Watts/cm.² |
|---|---|
| 54 | 0.30 |

These results show that the flame-retardancy of the carpet compared flavorably with that of carpet of Example 1 that contained zinc borate instead of zinc oxide. However, surprisingly, the luster of the polyamide fiber containing zinc borate was greatly superior to that of the polyamide fiber containing zinc oxide. This is attributed to the fact that the zinc borate essentially disappears in the polyamide whereas the zinc oxide gives the polyamide an opaque appearance.

EXAMPLE 3

A flame-retardant polyamide was prepared following the procedure of Example 1 except that 5 percent of zinc borate hydrate and 5 percent Dechlorane Plus were incorporated into the polyamide yarn, which may be called Yarn C. For comparative purposes, another flame-retardant polyamide was prepared by the procedure of Example 1 except that 5 percent of zinc oxide and 5 percent of Dechlorane Plus were incorporated into the polyamide yarn, which may be called Yarn D. Yarn C and Yarn D were each made into a carpet following the procedure of Example 1 except that samples of the fabric after tufting were dyed with various dyes in the conventional manner before the binding composition and the secondary jute backing were applied to complete the carpet. The carpet samples were then tested for colorfastness to light by the above-described AATCC Test Method 16E-1974, entitled Colorfastness to Light:Water-Cooled Xenon-Arc Lamp, Continuous Light. Samples were exposed for time periods necessary to establish the point at which a color change equivalent to Step 4 of the Gray Scale took place. Data are recorded in Table I. These data show that colorfastness was generally greater for carpet samples made with the polyamide fiber of the present invention (Yarn C) as compared with the fiber of the prior art (Yarn D).

TABLE I

COLORFASTNESS TO LIGHT (AATCC TEST METHOD 16E-1974)

| | Dye Used on Carpet (Color Index Designation) | | | | | |
|---|---|---|---|---|---|---|
| | Disperse Yellow 3 | Disperse Violet 18 | Acid Yellow 19 | Disperse Red 55 | Disperse Blue 7 | Acid Black 107 |
| Hours to Break Point* | | | | | | |
| Carpet Made from Yarn C | 40 | 40 | 40 | 40 | 60 | 80 |
| Carpet Made from Yarn D | 20 | 20 | 20 | 20 | 60 | 60 |

*Carpets exposed for time period necessary to establish the "break point", i.e., the point at which a color change equivalent to Step 4 of the Gray Scale is observed.

EXAMPLE 4

A flame-retardant carpet was prepared by the procedure of Example 1 except that the binder was a 25/75 ethylene-vinyl chloride copolymer latex and no hydrated aluminum oxide was used. The resulting carpet was tested in accordance with the above-described Critical Radiant Flux Test with the following results:

| Distance Burned (cm.) | Critical Energy, Watts/cm.² |
|---|---|
| 57 | 0.27 |

These results show that the flame-retardancy of the carpet compared favorably with that of carpet of Example 1. Better flame retardancy is obtained when the ethylene-vinyl chloride copolymer latex is mixed with 3-4 parts by weight of hydrated aluminum oxide to form a binding composition.

EXAMPLE 5

A flame-retardant carpet was prepared by the procedure of Example 1 except that 2 percent of a mixture of penta and hexachloronaphthalene was incorporated in the polyamide together with 2 percent of the total weight of finely ground zinc borate. The resulting carpet was tested in accordance with the above-described Critical Radiant Flux Test with the following results:

| Distance Burned (cm.) | Critical Energy, Watts/cm.$^2$ |
| --- | --- |
| 57 | 0.27 |

These results show that the flame-retardancy of the carpet compared favorably with that of carpet of Example 1.

We claim:

1. A flame-retardant pile carpet having a relatively pliable primary backing and a tufted surface, said surface being comprised of polyamide fibers having incorporated therein from 1 to 15 percent of the total weight of an organic chloride containing from 50 to 80 percent by weight of chlorine, which is substantially non-reactive with said polyamide except at temperatures above 300° C. and from 1 to 15 percent of the total weight of zinc borate, said fibers being bonded to said backing with a bonding substance comprising a latex material and a hydrate material selected from the group consisting of aluminum hydroxide and hydrated aluminum oxide, the ratio by weight of said latex material to said hydrate material being within the range 1:2 to 1:4.5.

2. The carpet of claim 1 wherein said polyamide is polycaprolactam.

3. The carpet of claim 1 wherein said latex material is an ethylene-vinyl chloride copolymer latex.

4. In a process for producing a pile carpet having a relatively pliable primary backing through which polyamide fibers are tufted, the improvements which comprises incorporating in said polyamide fibers from 1 to 15 percent of the total weight of an organic chloride containing from 50 to 80 percent by weight of chlorine, which is substantially non-reactive with said polyamide except at temperatures above 300° C. and from 1 to 15 percent of the total weight of zinc borate, and bonding said fibers to said backing with a bonding substance comprising a latex material and a hydrate material selected from the group consisting of aluminum hydroxide and hydrated aluminum oxide, the ratio by weight of said latex material to said hydrate material being within the range 1:2 to 1:4.5, whereby the carpet has improved flame-retardancy and superior luster.

5. The process of claim 4 wherein said polyamide is polycaprolactam.

6. The process of claim 4 wherein said latex material is an ethylene-vinyl chloride copolymer latex.

* * * * *